J. D. FERRY.
FRUIT GATHERER.
APPLICATION FILED AUG. 20, 1918.
1,312,967.
Patented Aug. 12, 1919.
2 SHEETS—SHEET 1.
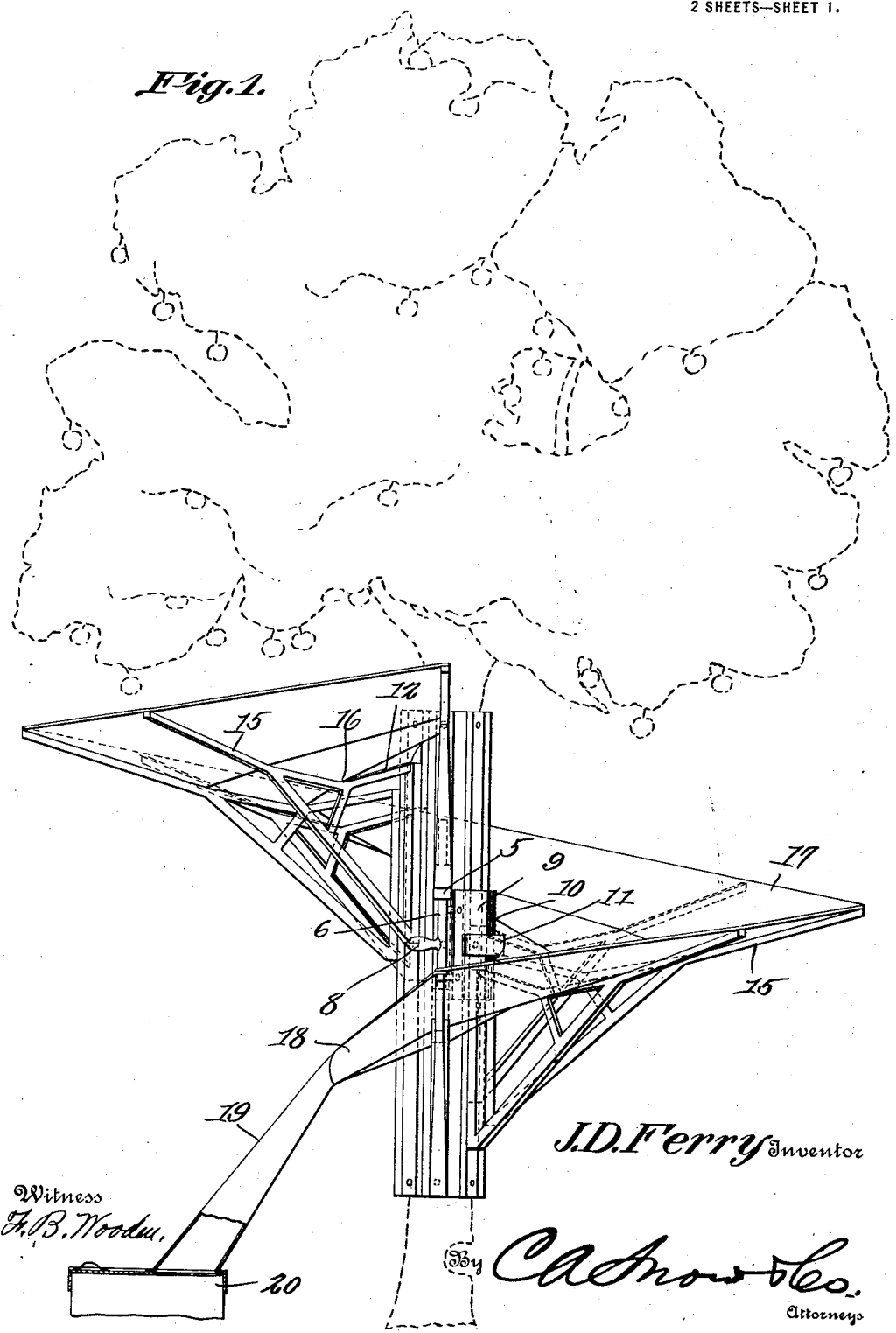

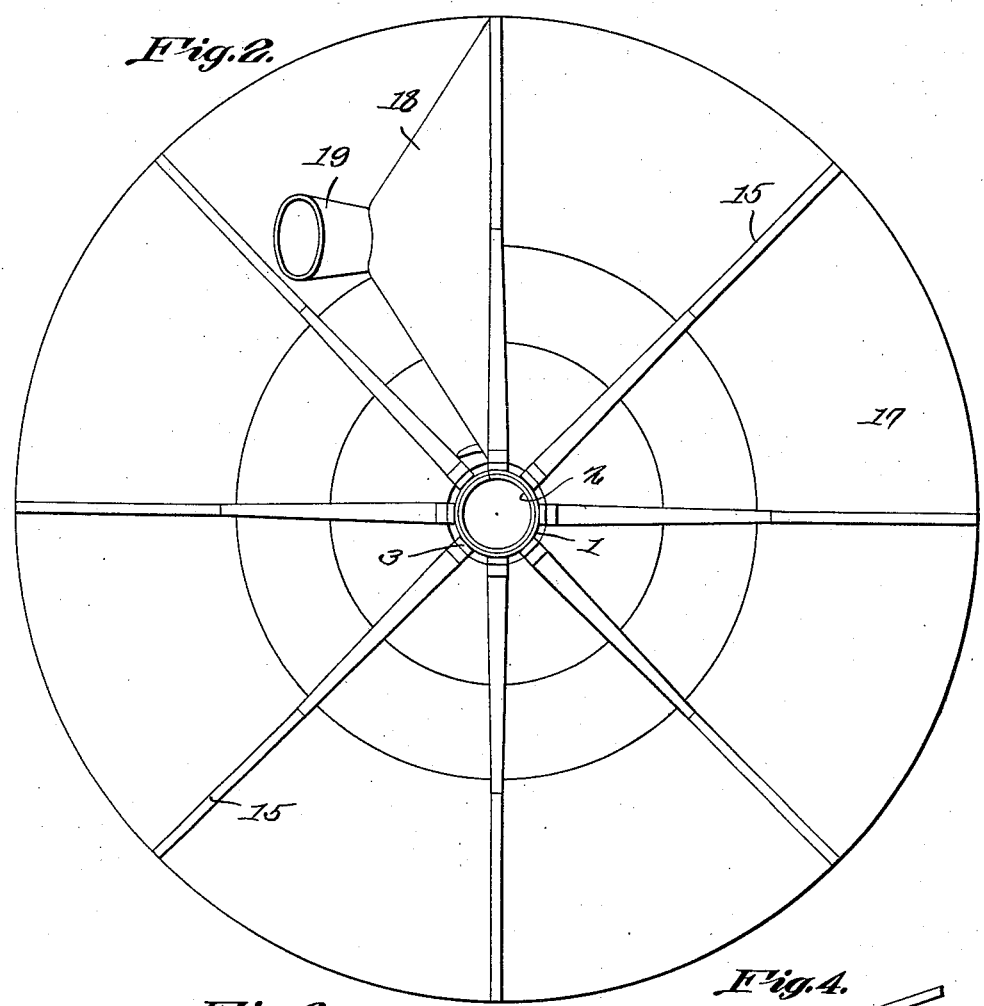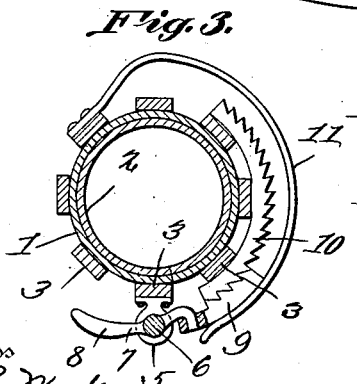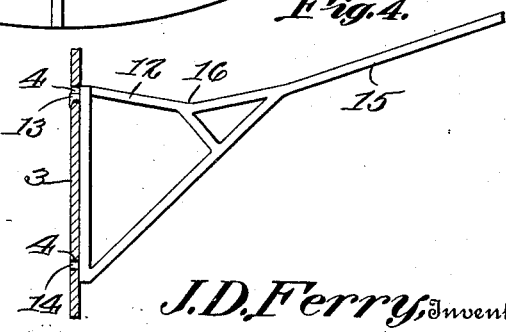

UNITED STATES PATENT OFFICE.

JOSEPH DUTRA FERRY, OF NILES, CALIFORNIA.

FRUIT-GATHERER.

1,312,967.  Specification of Letters Patent.  Patented Aug. 12, 1919.

Application filed August 20, 1918. Serial No. 250,696.

*To all whom it may concern:*

Be it known that I, JOSEPH D. FERRY, a citizen of the United States, residing at Niles, in the county of Alameda and State of California, have invented a new and useful Fruit-Gatherer, of which the following is a specification.

This invention relates to fruit gatherers, one of its objects being to provide a structure which can be carried readily from place to place and can be set up quickly so as to fit snugly around a tree of any diameter and catch fruit falling from the tree, there being means combined with the gatherer for directing the fallen fruit into crates or other containers provided therefor.

A further object is to provide a structure of this character which will not injure the trees to which it is attached and which will gather the fruit without bruising it.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is an elevation of the fruit gatherer in position, the outlet end of the delivery spout being shown in section.

Fig. 2 is a plan view of the gatherer.

Fig. 3 is a transverse section through the tree gripping sleeve and its adjustable holding means.

Fig. 4 is a vertical section through a portion of the sleeve and showing one of the radial arms connected thereto.

Referring to the figures by characters of reference, 1 designates a sheet of leather or other durable flexible material having a lining 2 of rubber or other soft material adapted to contact with the trunk of a tree and prevent injury thereto. Strips 3 of metal are secured to the outer surface of the sheet 1 and extend from end to end thereof, each of these strips being provided with spaced openings 4 for the purpose hereinafter described.

Secured to the strip 3 along one edge of the sheet 1 are ears 5 forming bearings for trunnions 6 extending from a lever 7. One end of the lever forms a handle 8 while the other end thereof engages a toothed block 9. The teeth on this block are adapted to engage teeth formed on the outer surface of a plate 10 which is secured to the strip 3 adjcaent the other edge of sheet 1 and to the adjacent strips 3. A spring strip 11 is secured to an intermediate strip 3 and extends partly around the structure, pressing inwardly against the block 9 so as to hold it in engagement with the teeth on plate 10. By referring to the drawings it will be noted that the teeth on the block and plate are so formed that the block can slip over the plate 10 to reduce the diameter of the sleeve formed by the sheet 1 but cannot be moved in the opposite direction unless first pushed radially against the spring 11 to become disengaged from the toothed plate 10.

From the foregoing it will be apparent that the sheet 1 can be placed about the trunk of a tree and tightened by pressing the block 9 over the toothed plate 10. If necessary one or more of the strips 3 can be detached to allow the device to fit very small trees. In Fig. 3 the size of the opening surrounded by the sheet 1 has been reduced to the minimum. The device can be enlarged to engage larger trees by pressing the block 9 outwardly against the spring 11 so as to disengage it from the pivot member 10. The block can then be partially withdrawn from under the spring 11, thus to increase the size of the opening surrounded by the plate 1 by allowing the edges of said plate to move apart. After the sheet 1 has thus been secured in place skeleton frames 12 are placed in position against the strips 3, each of these frames having an upper lug 13 and a lower lug 14 adapted to be inserted in the openings 4. The upper lugs 13 have hooked ends for engaging the lower walls of the upper openings 4 thus to hold the frames supported in position. Each frame 12 has an upwardly and outwardly inclined arm 15 at the upper end thereof and the top of each frame is depressed, as shown at 16. The openings 13 and 14 in each strip 3 are at elevations different from those in the other strips so that, when the several frames 12 are placed in position they will be located spirally around the sleeve formed by sheet 1.

A strip 17 of canvas or the like is secured upon the arms 16 and the depressed portions 16 of the frames 12 and thus forms a spiral trough extending around the trunk of the tree to which the apparatus is attached. At the lower end of the trough is provided a discharge spout 18 adapted to deliver fruit through a tube 19 into a container 20. It will be apparent, of course, that when the tree to which the apparatus is applied is shaken the fruit will fall onto the canvas and roll to the outlet spout and thence to the container. Should the branches of the tree be unusually large, extensions can be attached to the arms 15 and canvas attached thereto, thus to catch the falling fruit.

It will be apparent that the apparatus can be readily taken down, transported to another tree, and set up for use.

What is claimed is:—

1. A fruit gatherer including a flexible sheet, means for adjustably securing the sheet about the trunk of a tree, frames detachably connected to the sheet and extending outwardly therefrom, spirally arranged arms upon the frames, a fabric strip secured to the arms and extending spirally around the engaged trunk, and an outlet spout at the lower end of the strip.

2. A fruit gatherer including a flexible sheet, means for adjustably securing the sheet about the trunk of a tree, said means including a toothed strip secured to one edge portion of the sheet, a toothed block movably connected to the other edge portion of the sheet, and yielding means for holding the block in engagement with the toothed strip, spirally arranged frames extending radially from the sheet, and a fabric strip secured to the frames and forming a spiral trough.

3. A fruit gatherer including a flexible sheet, adjustable means for securing the sheet around the trunk of a tree, a lining upon said sheet, strips arranged longitudinally upon the sheet and secured thereto and having apertures, frames, lugs on the frames for engagement with the apertured portions of the strips for holding the frames detachably to the strips, and a fabric strip secured to the frames.

In testimony that I claim the foregoing as my own, I have hereto affixed my signature in the presence of two witnesses.

JOE DUTRA FERRY.

Witnesses:
E. A. DIAS,
MAX KING.

Copies of this patent may be obtained for five cents each, by addressing the "Commissioner of Patents, Washington, D. C."